US009980222B2

(12) United States Patent
de Jager et al.

(10) Patent No.: US 9,980,222 B2
(45) Date of Patent: May 22, 2018

(54) HIGH DATA LOW LATENCY COMMUNICATIONS WITH MINIMIZED POWER CONSUMPTION

(71) Applicant: Itron, Inc., Liberty Lake, WA (US)

(72) Inventors: Johann de Jager, Waseca, MN (US); Christopher Lloyd Osterloh, Waseca, MN (US)

(73) Assignee: ITRON, INC., Liberty Lake, WA (US)

( * ) Notice: Subject to any disclaimer, the term of this patent is extended or adjusted under 35 U.S.C. 154(b) by 145 days.

(21) Appl. No.: 14/969,137

(22) Filed: Dec. 15, 2015

(65) Prior Publication Data

US 2017/0171815 A1 Jun. 15, 2017

(51) Int. Cl.
G08C 17/00 (2006.01)
H04W 52/02 (2009.01)
H04W 88/06 (2009.01)

(52) U.S. Cl.
CPC ... H04W 52/0216 (2013.01); H04W 52/0274 (2013.01); H04W 88/06 (2013.01)

(58) Field of Classification Search
CPC ......... H04W 52/0216; H04W 52/0274; H04W 88/06
See application file for complete search history.

(56) References Cited

U.S. PATENT DOCUMENTS 5,025,486 A * 6/1991 Klughart ........... H04W 52/0229
340/10.1
5,553,492 A * 9/1996 Barrett ..................... E21B 49/08
73/152.18
5,805,989 A 9/1998 Ushida
(Continued)

FOREIGN PATENT DOCUMENTS

| JP | 09-181660 | 7/1997 |
|---|---|---|
| JP | 2001175979 | 6/2001 |
| JP | 2003273781 | 9/2003 |

OTHER PUBLICATIONS

"Cradlepoint MBR900 Mobile Broadband N Router Reviewed," from <http://www.smallnetbuilder.com/wireless/wireless-reviews/31423-cradlepoint-mbr900-mobile-broadband-n-router-reviewed>, Feb. 22, 2011, 15 pages.

(Continued)

Primary Examiner — Robert Wilson (57) ABSTRACT

An endpoint device capable of communicating with a data collection device comprises a first communication subsystem for low data rate messaging, a second communication subsystem for high data rate messaging, and a controller in communication with the first and second communication subsystems, where the first communication subsystem may be used as a primary means of communications with the data collection device, and the second communication subsystem may be used as needed for high data rate communications with the data collection device. The controller may turn on the second communication subsystem for scheduled or unscheduled transfer of data at a high data rate, in response to receiving a wake-up command from the data collection device, in response to receiving an alarm event at the endpoint device, etc. A wake-up command may include a request for data between scheduled data transfers, a parameter change request, etc. Various methodologies are also disclosed.

24 Claims, 6 Drawing Sheets

(56) References Cited

U.S. PATENT DOCUMENTS

| | | | |
|---|---|---|---|
| 7,434,076 | B1 | 10/2008 | Altounian et al. |
| 7,583,197 | B2 | 9/2009 | Wesby Van Swaay |
| 8,094,010 | B2 | 1/2012 | Wesby-Van Swaay |
| 2004/0120421 | A1 | 6/2004 | Filipovic |
| 2004/0266493 | A1* | 12/2004 | Bahl ................. H04W 52/0277 455/574 |
| 2005/0162283 | A1* | 7/2005 | Salazar Cardozo ..... H04Q 9/00 340/870.11 |
| 2006/0030338 | A1* | 2/2006 | Harken ................. H04W 88/02 455/456.6 |
| 2007/0149257 | A1 | 6/2007 | Cheresh et al. |
| 2009/0028098 | A1 | 1/2009 | Gates et al. |
| 2009/0179771 | A1* | 7/2009 | Seal ....................... G01D 4/002 340/870.04 |
| 2009/0243869 | A1* | 10/2009 | Sanderford, Jr. ...... G01D 4/002 340/657 |
| 2010/0278187 | A1 | 11/2010 | Hart et al. |
| 2011/0194543 | A1 | 8/2011 | Zhao et al. |
| 2014/0133379 | A1* | 5/2014 | Wang ................... H04W 24/02 370/311 |

OTHER PUBLICATIONS

Australian Examination Report No. 1, dated Dec. 3, 2014, Australian Patent Application No. 2011379361, 3 pages.
Australian Notice of Acceptance dated May 14, 2015, Australian Patent Application No. 2011379361, 2 pages.
Canadian Office Action dated Apr. 22, 2013, Canadian Patent Application No. 2,755,393, 2 pages.
Extended European Search Report dated Sep. 10, 2015, European Patent Application No. 11874154.5, 8 pages.
International Search Report and Written Opinion dated Feb. 22, 2012, PCT Application No. PCT/US2011/062791,10 pages.
Japanese Office Action dated Sep. 9, 2014, with English translation, for Japanese Patent Application No. 2014-537049, 4 pages.
Japanese Final Office Action, with English translation, dated Mar. 10, 2015, for Japanese Patent Appl. No. 2014-537049, 5 pages.
Office Action for Canadian Patent Application No. 2,755,393, dated Jul. 16, 2012, 2 pages.
Office Action for Canadian Patent Application No. 2,755,393, dated Mar. 2, 2012, 3 pages.
Office Action dated Oct. 29, 2012, for Canadian Patent Application No. 2,755,393, 2 pages.

* cited by examiner

HIGH DATA LOW LATENCY COMMUNICATIONS WITH MINIMIZED POWER CONSUMPTION

FIELD OF THE DISCLOSURE

This disclosure relates generally to communication systems, and, more particularly, to communication systems involving battery operated devices.

BACKGROUND

The demands on data collection systems have grown significantly in recent years as technology continues to improve and the need for more information continues to increase. Some data collection systems, such as utility metering systems and other systems that require collection of large amounts of data from a large number of endpoints, are primarily wireless systems with many, if not all, of the endpoints powered by batteries. In utility metering systems (in particular, gas and/or water metering systems), this may be for safety reasons, as it is not considered safe to run electricity near gas or water. The communication networks used for these systems are typically low data-rate networks that until recently served the purpose well. However, combining a need for low latency and even higher amounts of data over a low data-rate network will require more power, and in turn will require much stronger, and/or a higher number of, batteries per endpoint. Otherwise, the battery life of an endpoint will not meet the current lifetime requirement of about 10-20 years. Cellular networks may have the capability of handling data transfers at high data rates, but using cellular communications consumes a large amount of power in the endpoints, especially with continuous use. In turn, using cellular communications may limit responses to possible alarm messages since endpoints cannot be connected to the cellular network continuously, or even for extended periods of time, without significant drain on power.

BRIEF DESCRIPTION OF THE DRAWINGS

In the drawings, the leftmost digit(s) of a reference number may identify the drawing in which the reference number first appears.

DETAILED DESCRIPTION

Current communication systems used in data collection networks may be implemented for specific operations (e.g., involving wireless communications to/from battery-operated devices), which may work for fixed networks, but may be short in range and very slow (i.e., transferring data at a low data-rate (e.g., less than 10 Kbps)). In addition, due to power considerations, endpoints in these systems cannot be left on very long, so access to these devices may be limited. These current solutions are not sufficient for systems that require quick, low latency retrieval of large amounts of data, both scheduled and on-demand. The following description discloses communication solutions in which scheduled and/or on-demand, low latency collection of large amounts of data can occur over an increased range while minimizing power consumption.

Embodiments are now described with reference to the figures, where like reference numbers may indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

Figure 1:
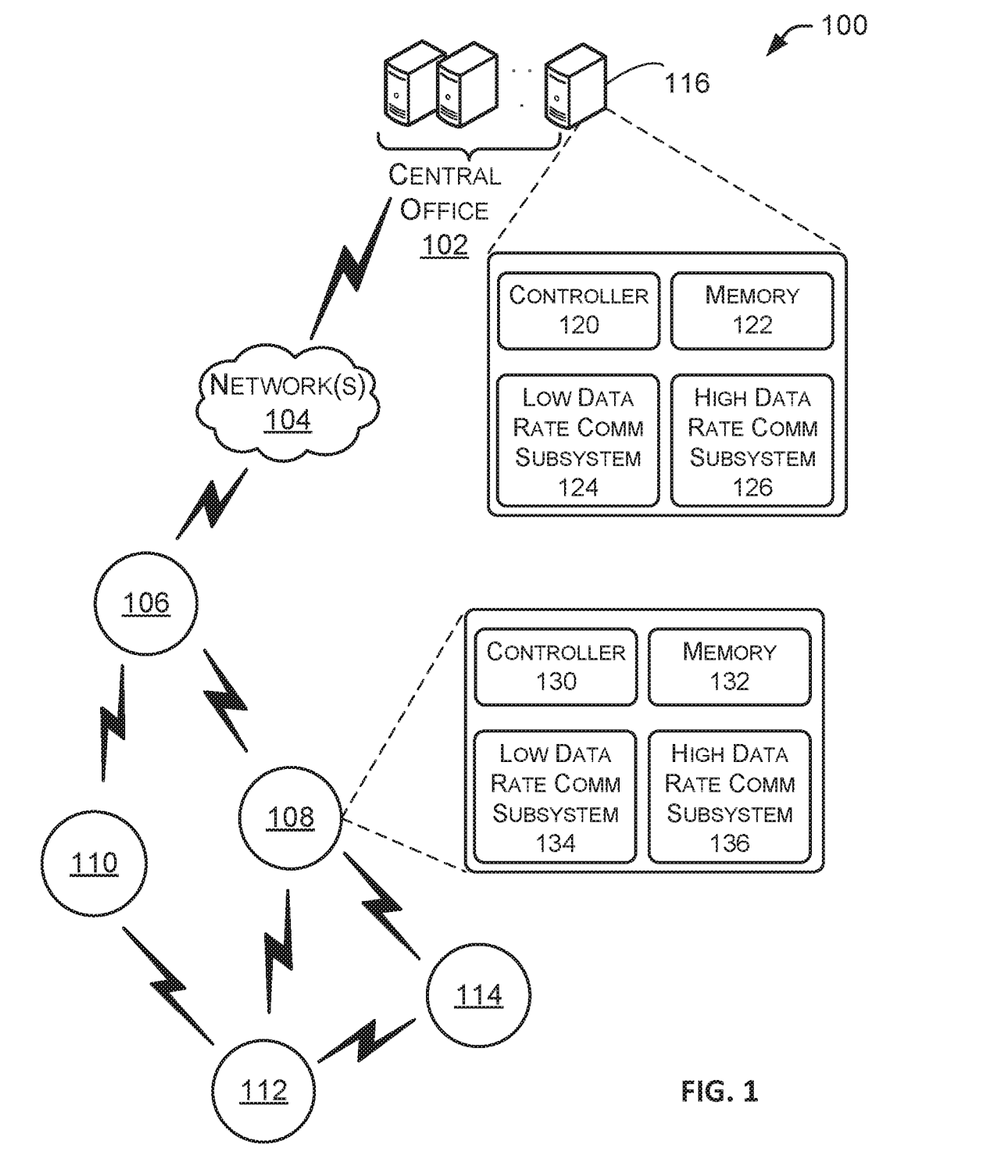
FIG. 1 is an illustration of a network environment in which example methods, apparatus, and articles of manufacture disclosed herein may be implemented, according to embodiments of this disclosure.

FIG. 1 illustrates an example data collection network 100 (e.g., an advanced meter reading (AMR) network or other similar network). The network 100 may include a central office 102, which may be associated with a data collection/processing entity (e.g., a utility company in the case of an AMR network). The central office may communicate with network nodes through one or more networks 104, which may be the Internet or other network having widespread or local functionality. Network nodes may include nodes 106-114, which may include, for example, endpoint devices such as utility meters or other devices that may comprise sensors, actuators, etc. The plurality of network nodes/devices 106-114 may be configured in a mesh network, star network or other configuration. One or more of the network nodes (e.g., device 106) may be a data collector and/or concentrator that may be configured for communication (e.g., radio frequency (RF) communication, cellular communication, etc.) with a plurality of downstream devices 108-114, which may also be configured for similar communications. In an example operation, data collector 106 may receive data or other communications from endpoint devices 108-114. For example, for an AMR network, the data may include consumption information associated with an electric, gas or water meter. Additionally, data collector 106 may send software updates, firmware updates, instructions or other information to one or more of the endpoint devices 108-114. While in this example, a data collector is shown as a network node, in other embodiments, the data collector may be located at the central office (e.g., data collector 116) and/or may be embodied in a mobile data collection device (not shown). In an embodiment, one or more network nodes (e.g., endpoint devices 106-114) may be battery-operated devices.

In an expanded view, data collector 116 (and/or data collector 106) may include, among other components, a controller 120, a memory 122, a low data rate communication subsystem 124 (e.g., configured for RF communications or another type capable of low data rate communications (e.g., less than 10 Kbps)), and a high data rate communication subsystem 126 (e.g., configured for cellular communications (e.g., 3G, 4G, LTE, LTE Direct, LTE Advanced, LTE-U, etc.), Wi-Fi, WiMAX, or any other standards-based or proprietary communications system capable of high data rate communications (e.g., greater than 1 Mbps)). Similarly, an endpoint device, such as any of devices 108-114 (and 106, if not configured as a data collector), may include, among other components, a controller 130, a memory 132, a low data rate communication subsystem 134 (e.g., configured for RF communications or another type capable of low data rate communications (e.g., less than 10 Kbps)), and a high data rate communication subsystem 136 (e.g., configured for cellular communications (e.g., 3G, 4G, LTE, LTE Direct, LTE Advanced, LTE-U, etc.), Wi-Fi, WiMAX, any other standards-based or proprietary communications system capable of high data rate communications (e.g., greater than 1 Mbps)).

Figure 2:
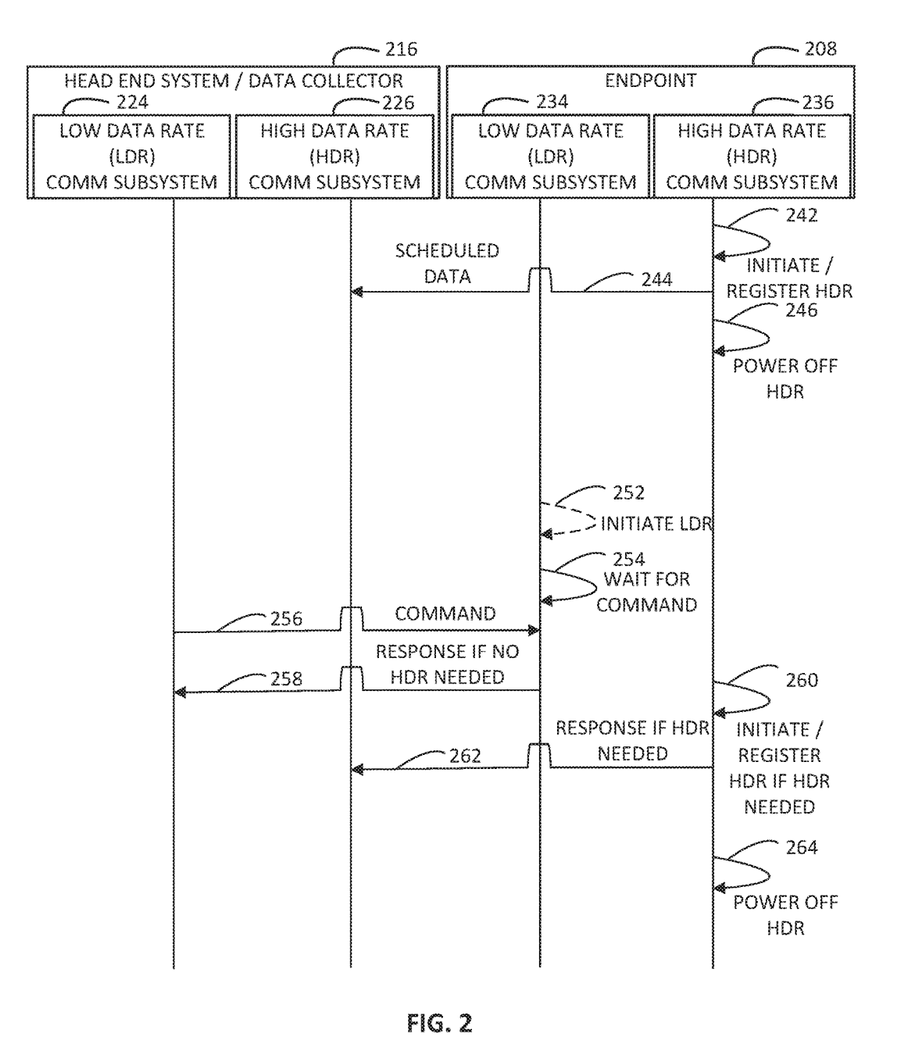
FIG. 2 is a sequence diagram illustrating communications between a data collection device (e.g., of a head-end system), and an endpoint, according to embodiments of this disclosure.

FIG. 2 is a sequence diagram illustrating communications between a data collection device and an endpoint device, according to embodiments of this disclosure. As shown in FIG. 2, a data collection device 216 (e.g., device 116 of central office 102, or device 106 of FIG. 1 (if configured as a data collector)) may include a low data rate (LDR) communication subsystem 224 and a high data rate (HDR) communication subsystem 226. An endpoint device 208 (e.g., example endpoint device 108 of FIG. 1) may include a low data rate (LDR) communication subsystem 234 and a high data rate (HDR) communication subsystem 236. For regularly scheduled data transfers, endpoint device 208 may initiate its HDR communication subsystem 236 (at 242), send the data to data collection device 216 at the high data rate (at 244), and power off the HDR communication subsystem 236 (at 246) to conserve power. In embodiments, initiating the HDR communication subsystem 236 may be in response to an internal command within endpoint device 208 (e.g., to turn on at a scheduled time or during a scheduled time window), or may be in response to a "wake up" command received from data collection device 216 (not shown). In an embodiment, HDR communication subsystem 236 may need to be registered with an associated network (e.g., one or more of network(s) 104 of FIG. 1) upon initiation.

For unscheduled data transfer requests and/or other requests, if LDR communication subsystem 234 is not already on, at 252, endpoint device 208 may initiate LDR communication subsystem 234 (which may include registration with an associated network, if necessary). In embodiments, initiating the LDR communication subsystem 234 may be in response to an internal command within endpoint device 208 (e.g., to turn on at a scheduled time or during a scheduled time window), or may be in response to a "wake up" command (not shown) received from data collection device 216. At 254, LDR communication subsystem 234 may wait, or listen, for a command. At 256, a command from data collection device 216 may be received by endpoint device 208 at a low data rate via LDR communication subsystems 224/234. In an embodiment, endpoint device 208 may internally issue a command (e.g., in response to an alarm event occurring at the endpoint device). The command may be, for example, an unscheduled data transfer, a parameter change for the endpoint device, etc. The received command, if sent by data collection device 216, may be in response to, for example, a customer complaint (e.g., regarding a bill), a need for general investigation or auditing of an endpoint device, or an alarm event received by data collection device 216. An alarm event may be an alert regarding, for example, an over-pressure condition, an under-pressure condition, or an over-consumption condition at endpoint device 208, or at a neighboring (or nearby) endpoint device to endpoint device 208. Neighboring, or groups of, endpoints may be polled for data for investigative purposes, for example.

In embodiments, whether a data transfer at a high data rate is required may be determinable by the endpoint device. For example, the endpoint device may be instructed to transfer data and/or a response in the received command/request. In another example, whether to transfer data and/or a response using a high data rate may be determined based on how much data is to be transferred (e.g., based on a predetermined threshold amount) and/or based on the urgency of the command/request (e.g., if in response to an alarm event involving a potentially dangerous condition). In an embodiment, if the command/request received at endpoint device 208 does not require a data transfer at a high data rate, a response to the command/request may be sent from endpoint device 208 at a low data rate via LDR communication subsystems 224/234 (258). The response at the low data rate may include, for example, requested data (e.g., if a small amount or not urgently needed), and/or a confirmation whether the request was received and/or executed (e.g., a successful parameter change, an error message, etc.). If, however, the command/request received at endpoint device 208 does require a data transfer at a high data rate, HDR communication subsystem 236 may be initiated (260) by endpoint device 208 (e.g., a receiver of the HDR communication subsystem 236 of endpoint device 208 may be turned on). In an embodiment, the request received, if from data collection device 216, may include a command to the endpoint device to "wake up" or turn on the HDR communication subsystem 236. In another embodiment, the endpoint device 208 itself may send an instruction to "wake up" or turn on the HDR communication subsystem 236 in response to receiving the request. If necessary, HDR communication subsystem 236 may be registered with its associated network as part of its initiation. At 262, a response may be sent from endpoint device 208 to data collection device 216 via the HDR communication subsystems 226/236. The response may include for example, requested data, and/or a confirmation whether the request was received and/or executed (e.g., a successful parameter change, an error message, etc.). Once the transmission at a high data rate is complete, HDR communication subsystem 236 at endpoint device 208 may be turned off (264) to conserve power. The LDR communication subsystem 234 may optionally be turned off as well.

Figure 3:
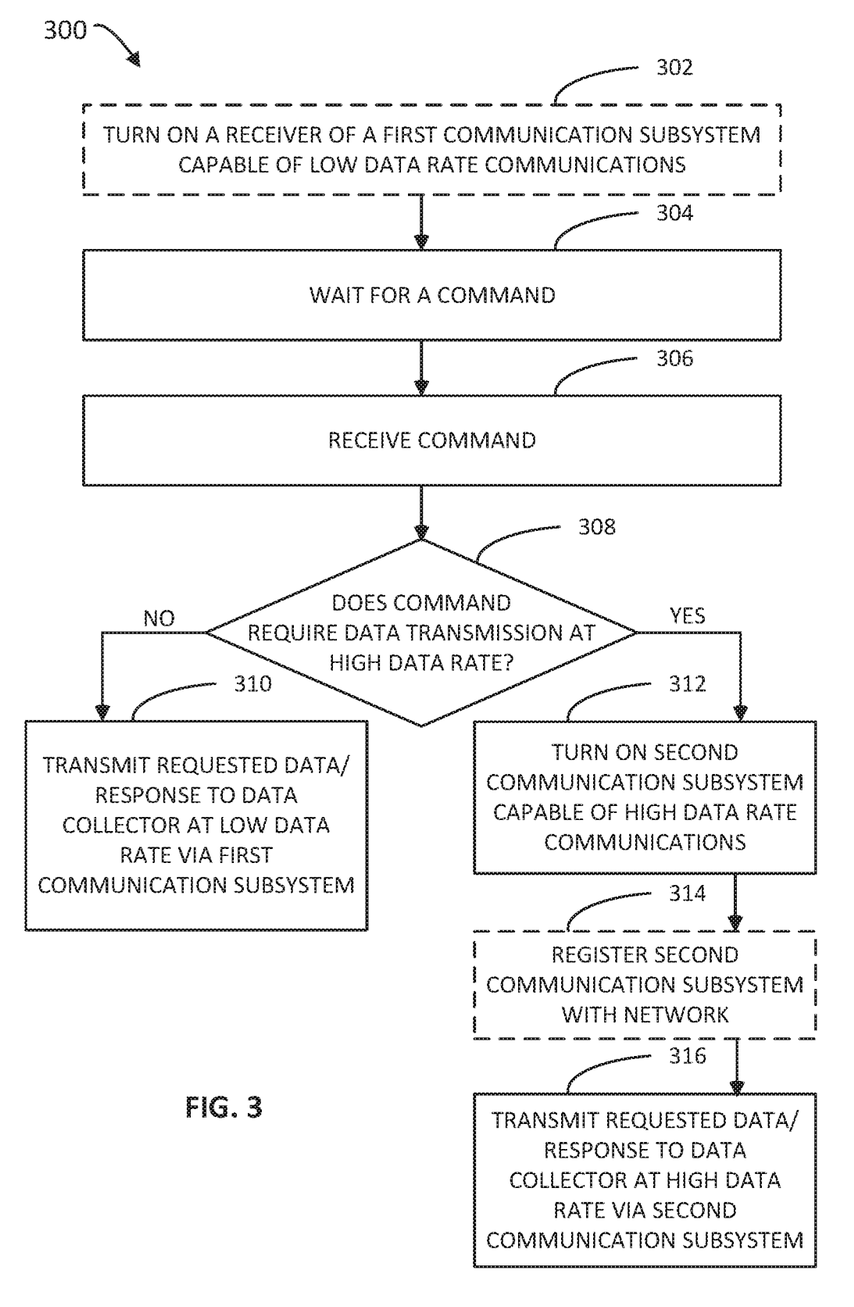
FIG. 3 is a flow diagram of an example communication process from the perspective of an endpoint device, according to embodiments of this disclosure.

FIG. 3 is a flow diagram of an example communication process 300 from the perspective of an endpoint device (such as any of endpoint devices 106-114), according to embodiments of this disclosure. At 302, if not on already, a receiver of a first communication subsystem (e.g., low data rate communication subsystem 134 of FIG. 1) of the endpoint device, which is capable of low data rate communications, may be turned on by a controller (e.g., controller 130) of the endpoint device. In an embodiment, a data collector (e.g., data collection device 116 of a head-end system, or device 106 (if a data collector)) may have sent a command to the endpoint device to "wake up" and/or to turn on the low data rate communication subsystem. In another embodiment, the endpoint device itself may send an instruction to "wake up" or turn on the low data rate communication subsystem (e.g., at a predetermined "wake up" time, during a predetermined "wake up" window during which the endpoint device is scheduled to be on and listening for communications, in response to an alarm event received or detected by the endpoint device, etc.). At 304, the endpoint device may listen, or wait, for a command from data collection device 116 (or 106), or internally (e.g., in response to an alarm event). At 306, a command may be received from the data collection device 116 (or 106), or may be issued/received internally. The received command may be, for example, a request for a regularly scheduled submission of data, an unscheduled request for data, a parameter change request for the endpoint device, etc. The received wake-up command and/or the command requesting data or a parameter change may have been sent in response to, for example, a customer complaint (e.g., regarding a bill), a need for general investigation or auditing of an endpoint device, or an alarm event received by the data collection device 116 (or 106) or by the endpoint itself. An alarm event may be an alert regarding, for example, an over-pressure condition, an under-pressure condition, or an over-consumption condition at the endpoint device, or at a neighboring (or nearby) endpoint device.

At 308, the endpoint device may determine whether the command requires data transmission at a high data rate (e.g., if a large amount of data is requested, if data is requested in response to an alarm condition (e.g., a potentially dangerous condition or one needing immediate investigation, etc.), etc.). If data transmission at a high data rate is not needed (e.g., if only a small amount of data is requested, or if the request was for a parameter change, and not urgently needed, etc.), the requested data and/or a response may be sent to data collection device 116 (or 106) at the low data rate via the low data rate communication subsystem at 310. The response may include requested data, and/or may confirm that the request was received and/or executed (e.g., a successful parameter change). A response may also signify if the request was unable to be executed (e.g., an error message). If data transmission at a high data rate is needed, a receiver of a high data rate communication subsystem of the endpoint device (e.g., high data rate communication subsystem 136), capable of data transmission at a high data rate, may be turned on at 312. In an embodiment, the request received from data collection device 116 (or 106) may have included a command to the endpoint device to "wake up" or turn on the high data rate communication subsystem. In another embodiment, the endpoint device itself may send an instruction to "wake up" or turn on the high data rate communication subsystem in response to receiving the request. If necessary, the high data rate communication subsystem may be registered with its associated network(s) at 314. At 316, the requested data and/or a response may be sent to data collection device 116 (or 106) at the high data rate via the high data rate communication subsystem. The response may include requested data, and/or may confirm that the request was received and/or executed. A response may also signify if the request was unable to be executed (e.g., an error message). Once the transmission at a high data rate is complete, the high data rate communication subsystem may be turned off to conserve power. The low data rate communication subsystem may optionally be turned off as well.

Figure 4:
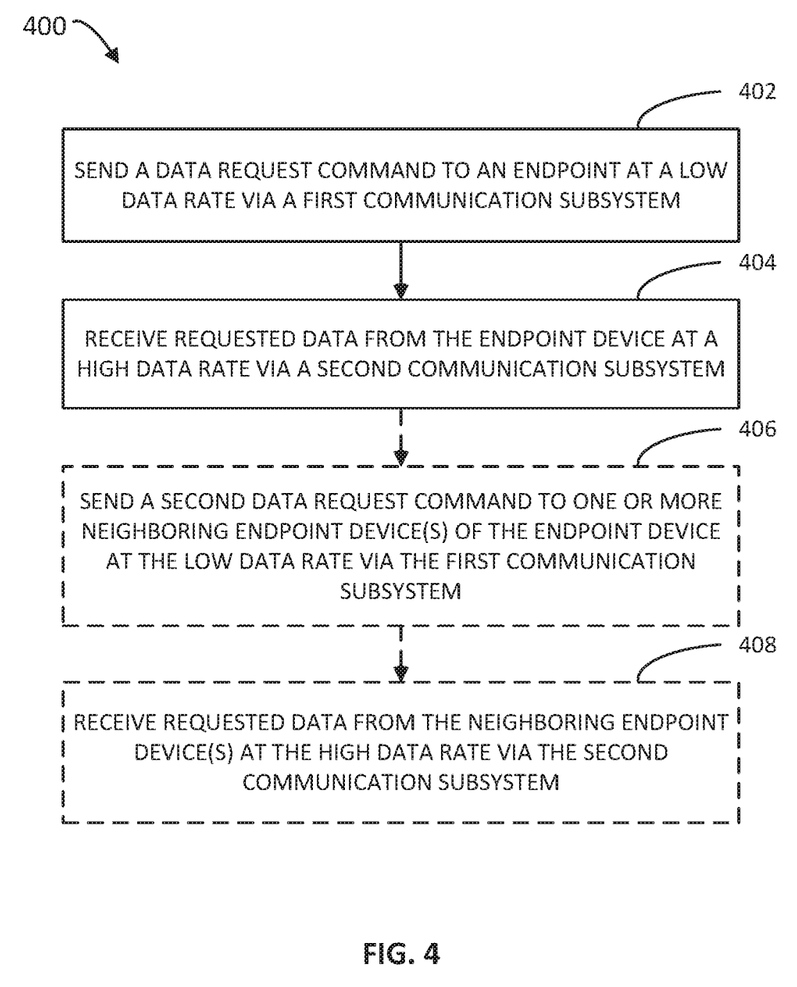
FIGS. 4 and 5 are flow diagrams of example communication processes from the perspective of a data collection device, according to embodiments of this disclosure.
Figure 5:
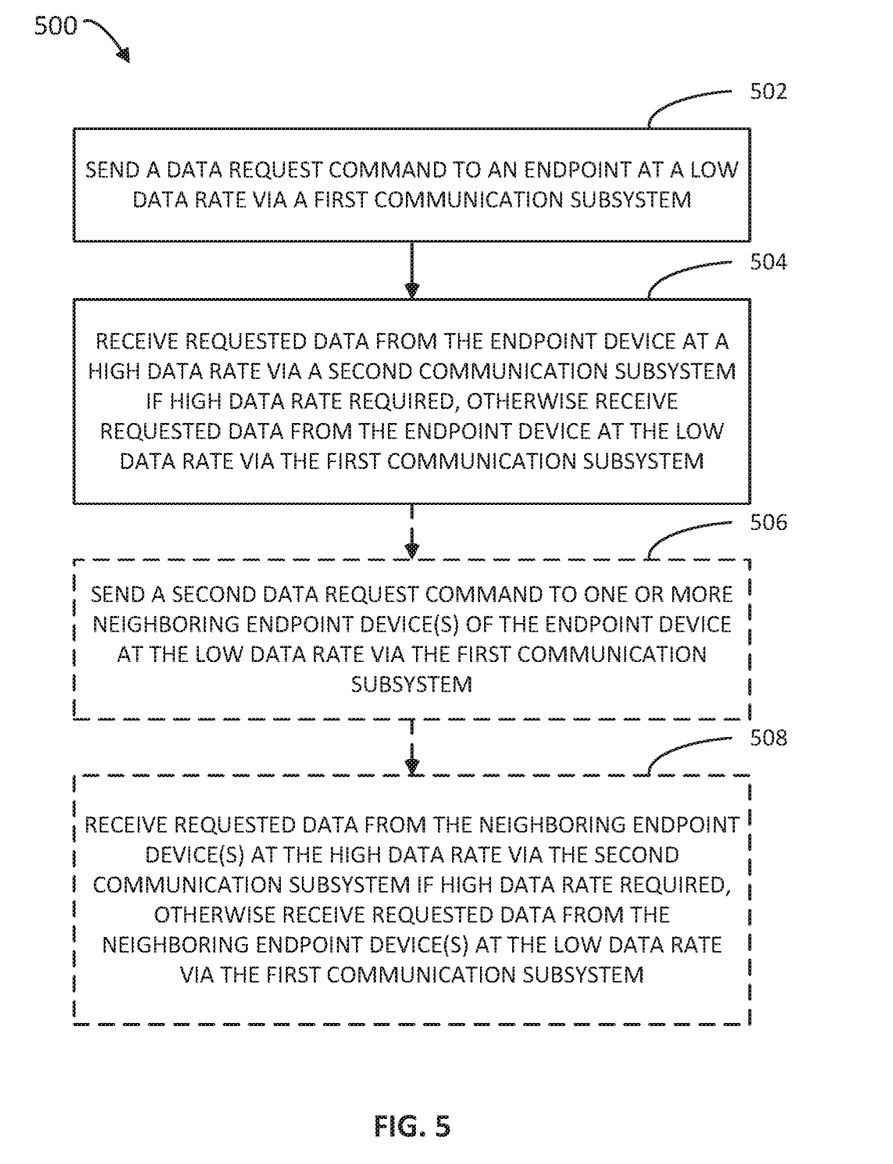

FIGS. 4 and 5 are flow diagrams of example communication processes 400/500 from the perspective of a data collection device (e.g., data collector 116, or 106), according to embodiments of this disclosure. In process 400, the high data rate is used for all requested data transfers, whereas, in process 500, the high data rate is not used unless required. Referring to process 400, at 402, a data request command may be sent to an endpoint device (e.g., any of devices 106-114) at a low data rate via a first communication subsystem (e.g., low data rate communication subsystem 124, such as an RF communications system). The request for data may also include a "wake up" command, if, for example, the request is being sent outside of that endpoint's scheduled "on" time. At 404, requested data is received from the endpoint device at a high data rate via a second communication subsystem (e.g., high data rate communication subsystem 126, such as a cellular communications system). Optionally, a data collector may also need data from one or more neighboring, or nearby, endpoint devices of the endpoint device. This may be desired, for example, in an alarm or investigation situation (e.g., involving a gas or water leak, an over or under pressure situation, etc.), which may require information from a plurality of devices to assist in identifying a problem. In this situation, a data collection device may optionally (at 406), send a second data request command to one or more neighboring, or nearby, endpoint device(s) of the endpoint device at the low data rate via the first communication subsystem, and may receive (at 408) the requested data from the neighboring, or nearby, endpoint device(s) at the high data rate via the second communication subsystem.

Process 500 is similar to process 400, except that the second communication subsystem for communicating using the high data rate is not used unless necessary. At 502, a data request command may be sent to an endpoint device at the low data rate, via the first communication subsystem. At 504, requested data is received from the endpoint device at the high data rate via the second communication subsystem if communications via the high data rate is necessary (e.g., if there are large amounts of data requested, or if the information is needed immediately in case of a potentially dangerous alarm condition, etc.). Otherwise, the requested data may be received from the endpoint device at the low data rate via the first communication system to conserve power (e.g., to conserve, or prolong, battery life). Similar to process 400, a data collection device may optionally (at 506), send a second data request command to one or more neighboring, or nearby, endpoint device(s) of the endpoint device at the low data rate via the first communication subsystem, and may receive (at 508) the requested data from the neighboring, or nearby, endpoint device(s) at the high data rate via the second communication subsystem if necessary. Otherwise, the requested data may be received from the neighboring, or nearby, endpoint device(s) at the low data rate via the first communication subsystem.

One or more features disclosed herein may be implemented in hardware, software, firmware, and/or combinations thereof, including discrete and integrated circuit logic, application specific integrated circuit (ASIC) logic, and microcontrollers, and may be implemented as part of a domain-specific integrated circuit package, or a combination of integrated circuit packages. The terms software and firmware, as used herein, refer to a computer program product including at least one computer readable medium having computer program logic, such as computer-executable instructions, stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, SRAM, DRAM, a hard drive, a solid state drive, or other data storage device.

A processing platform of an endpoint device (e.g., endpoint device 108), a computing device of a head-end system (e.g., device 116), a mobile collection device (not shown), and/or a data collection device (e.g., device 106) may be embodied in any type of mobile and/or non-mobile computing device. Examples of mobile devices may include, but are not to be limited to, laptop computers, ultra-laptop computers, tablets, touch pads, portable computers, handheld computers, palmtop computers, personal digital assistants (PDAs), e-readers, cellular telephones, combination cellular telephone/PDAs, mobile smart devices (e.g., smart phones, smart tablets, etc.), mobile internet devices (MIDs), mobile messaging devices, mobile data communication devices, mobile media playing devices, cameras, mobile gaming consoles, wearable devices, mobile industrial field devices, etc. Examples of non-mobile devices may include, but are not to be limited to, servers, personal computers (PCs), Internet appliances, televisions, smart televisions, data communication devices, media playing devices, gaming consoles, industrial field devices, etc.

Figure 6:
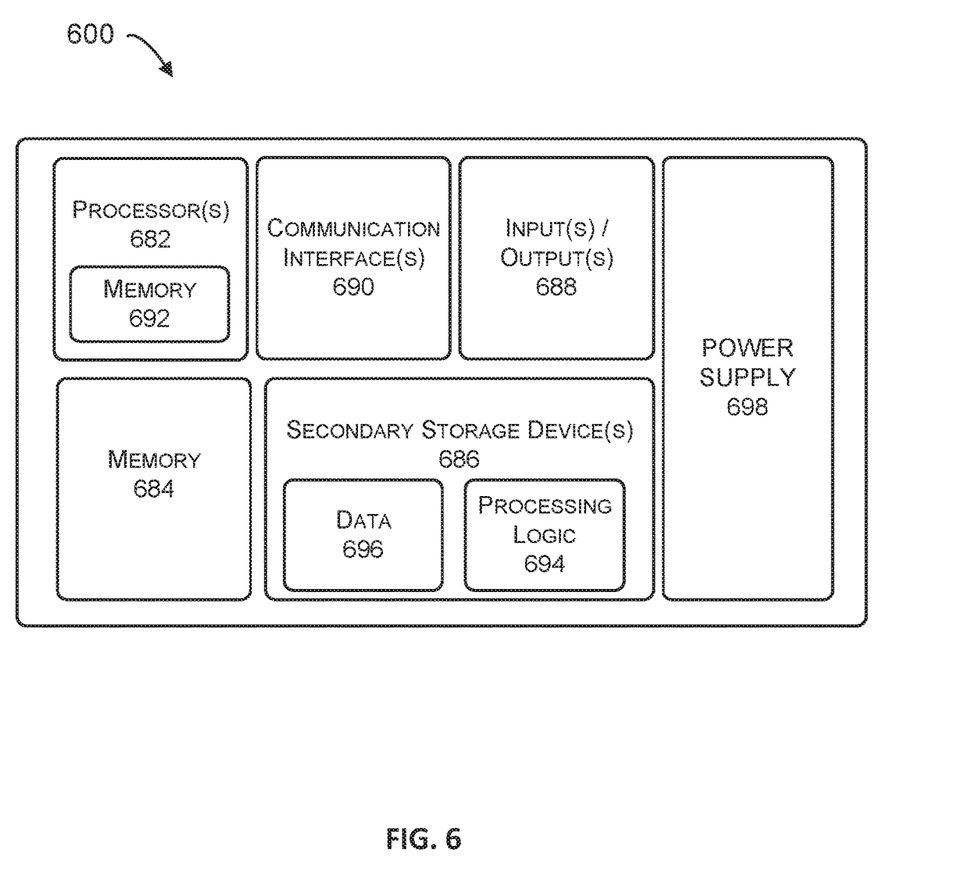
FIG. 6 is a block diagram of an example processing system that may embody an endpoint device or data collection device, according to embodiments of the present disclosure.

FIG. 6 is a block diagram of an example mobile or non-mobile device, according to embodiments. Processing platform 600 may include one or more processors 682, memory 684, one or more secondary storage devices 686, one or more input/output devices 688, and/or one or more communication interfaces 690, in communication via a bus, line, or similar implementation (not shown). Processing platform 600 may also include a power supply 698, which may include an interface to an electricity source and/or may include one or more batteries. Processor(s) 682 may be implemented by, for example but not limitation, one or more integrated circuits, logic circuits, microprocessors, controllers, etc. Processor(s) 682 may include a local memory 692 (e.g., a cache). Memory 684 may include a volatile and/or a non-volatile memory. Volatile memory may be implemented by, for example but not limitation, Synchronous Dynamic Random Access Memory (SDRAM), Dynamic Random Access Memory (DRAM), RAMBUS Dynamic Random Access Memory (RDRAM) and/or any other type of random access memory device. Non-volatile memory may be implemented by flash memory and/or any other desired type of memory device. Access to memory 684 may be controlled by a memory controller (not shown). Data stored in local memory 692 and/or memory 684 may be used by processor(s) 682 to facilitate data collection functions and/or communications, according to embodiments of this disclosure.

Input/output device(s) 688 may allow a user to interface with processor(s) 682. Input devices may allow a user to enter data and/or commands for processor(s) 682. Input devices may include, for example, an audio sensor, a microphone, a camera (e.g., still, video, etc.), a keyboard, a button, a mouse, a touchscreen, a track-pad, a trackball, isopoint, a voice recognition system, etc. Output devices may provide or present information to a user. Output devices may include, for example, display devices (e.g., a light emitting diode (LED), an organic light emitting diode (OLED), a liquid crystal display, a cathode ray tube display (CRT), a touchscreen, a tactile output device, a printer, speakers, etc.). The input/output device(s) 688 may be connected to processor(s) 682, for example, with an interface circuit (not shown). The interface circuit may be implemented by any type of interface standard, such as, for example, an Ethernet interface, a universal serial bus (USB), a PCI express interface, etc. For use with an output device, the interface circuit may include a graphics driver card, chip, and/or processor.

Communication interface(s) 690 may be implemented in hardware or a combination of hardware and software, and may provide wired or wireless network interface(s) to one or more networks, such as network(s) 104 of FIG. 1. Communication interface(s) 690 may be a part of, or connected with, the interface circuit discussed above, and/or may include or connect with communication devices such as a transmitter, a receiver, a transceiver, a modem and/or network interface card to facilitate exchange of data with external devices (e.g., computing devices of any kind) via a network, such as network(s) 104. Embodiments described herein may include a first communication interface for low data rate communications (e.g., less than 10 Kbps) and a second communication interface for high data rate communications (e.g., greater than 1 Mbps).

Secondary storage device(s) 686 may store processing logic 694 (e.g., software) to be executed by processor(s) 682, and/or data 696. Processing logic 694 and data 696 may be used by processor(s) 682 to facilitate data collection functions and/or communications between devices, according to embodiments of this disclosure. Processing logic 694 may include instructions for executing the methodology described herein, for example. Examples of secondary storage device(s) 686 may include one or more hard drive disks, compact disk (CD) drives, digital versatile disk (DVD) drives, Blu-ray disk drives, redundant array of independent disks (RAID) systems, floppy disk drives, flash drives, etc. Data and/or processing logic may be stored on a removable tangible computer readable storage medium (e.g., a floppy disk, a CD, a DVD, a Blu-ray disk, etc.) using one or more of the secondary storage device(s) 686.

The technology disclosed herein provides scheduled and/or on-demand low latency collection of large amounts of data from a large number of endpoint devices in which power consumption is minimized. In the embodiments described herein, it does not matter what information is communicated or what protocols or communication methods are used as long as one method can be used for higher data rate communications than other method(s) used. This multi-method communications solution allows for a desired high data rate without a significant power expense. Other advantages may also be contemplated.

The particular examples and scenarios used in this document are for ease of understanding and are not to be limiting. Though described for use with data collection from battery-powered devices used for utility metering, features described herein may be used in many other contexts and situations that may or may not involve battery power or utility metering. The power-saving features discussed herein may be beneficial in many other systems involving communications between devices.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An endpoint device capable of communicating with a data collection device, the endpoint device comprising:
   a first communication subsystem configured for low data rate messaging;
   a second communication subsystem configured for high data rate messaging; and
   a controller in communication with the first and second communication subsystems,
   wherein the first communication subsystem is to be used as a primary means of communications with the data collection device, and the second communication subsystem is to be used as needed for high data rate communications with the data collection device; and
   wherein the controller is to turn on the second communication subsystem in response to receiving a wake-up command from the data collection device via the first communication subsystem when the wake-up command includes a request for data that requires transmission at a high data rate.

2. The endpoint device of claim 1, wherein the low data rate messaging is via radio frequency communications.

3. The endpoint device of claim 1, wherein the high data rate messaging is via at least one of cellular communications, Wi-Fi, or WiMAX.

4. The endpoint device of claim 1, wherein the controller is to turn on the second communication subsystem for scheduled transfer of data at a high data rate.

5. The endpoint device of claim 1, wherein the controller is to turn on the second communication subsystem in response to receiving the wake-up command from the data collection device for one or more of: a request for data between scheduled data transfers or a parameter change.

6. The endpoint device of claim 1, wherein the controller is to turn on the second communication subsystem in response to receiving an alarm event at the endpoint device.

7. The endpoint device of claim 6, wherein the alarm event involves one or more of, in relation to providing a utility resource: an over-pressure condition, an under-pressure condition, or an over-consumption condition of the utility resource.

8. The endpoint device of claim 1, wherein the endpoint device is a battery-operated endpoint device.

9. A method of communication between an endpoint device and a data collection device over a network, the method comprising, at the endpoint device:
waiting for a wake-up command from the data collection device by a receiver of a first communication subsystem of the endpoint device, the first communication subsystem configured for low data rate communications; and
upon receiving the wake-up command, wherein the command includes a request for data that requires transmission at a high data rate:
turning on a second communication subsystem configured for high data rate communications; and
transmitting the requested data to the data collection device at the high data rate via the second communication subsystem.

10. The method of claim 9, further comprising:
upon receiving a command requesting data that does not require transmission at the high data rate:
transmitting the requested data to the data collection device at a low data rate via the first communication subsystem.

11. The method of claim 9, wherein the first communication subsystem uses radio frequency communications.

12. The method of claim 9, wherein the second communication subsystem uses at least one of cellular communications, Wi-Fi, or WiMAX.

13. The method of claim 9, wherein the command involves one or more of:
a regularly scheduled request for data, an unscheduled request for data, or an alarm event.

14. The method of claim 13, wherein the command is related to an alarm event involving one or more of, in relation to providing a utility resource: an over-pressure condition, an under-pressure condition, or an over-consumption condition of the utility resource.

15. The method of claim 9, further comprising:
in response to receiving an alarm event at the endpoint device:
turning on the second communication subsystem; and
transmitting data to the data collection device at the high data rate via the second communication subsystem.

16. The method of claim 9, wherein the wake-up command includes a request for data between scheduled data transfers.

17. A non-transitory computer-readable medium having computer program logic stored thereon, the computer program logic including instructions to cause a controller of an endpoint device to:
wait for a wake-up command from a data collection device, by a receiver of a first communication subsystem configured for low data rate communications; and
upon receiving the wake-up command, wherein the command includes a request for data that requires transmission at a high data rate:
turn on a second communication subsystem configured for high data rate communications; and
transmit the requested data to the data collection device at the high data rate via the second communication subsystem.

18. The computer-readable medium of claim 17, wherein the instructions further cause the controller to:
upon receiving a command requesting data that does not require transmission at the high data rate:
transmit the requested data to the data collection device at a low data rate via the first communication subsystem.

19. The computer-readable medium of claim 17, wherein the first communication subsystem uses radio frequency communications.

20. The computer-readable medium of claim 17, wherein the second communication subsystem uses at least one of cellular communications, Wi-Fi, or WiMAX.

21. The computer-readable medium of claim 17, wherein the command involves one or more of: a regularly scheduled request for data, an unscheduled request for data, or an alarm event.

22. The computer-readable medium of claim 17, wherein the command is related to an alarm event involving one or more of, in relation to providing a utility resource: an over-pressure condition, an under-pressure condition, or an over-consumption condition of the utility resource.

23. The computer-readable medium of claim 17, wherein the instructions further cause the controller to:
in response to receiving an alarm event at the endpoint device:
turn on the second communication subsystem; and
transmit data to the data collection device at the high data rate via the second communication subsystem.

24. The computer-readable medium of claim 17, wherein the wake-up command includes a request for data between scheduled data transfers.

* * * * *